July 1, 1941.  A. MEYER  2,247,845
COMBUSTION TURBINE PLANT
Filed June 6, 1939
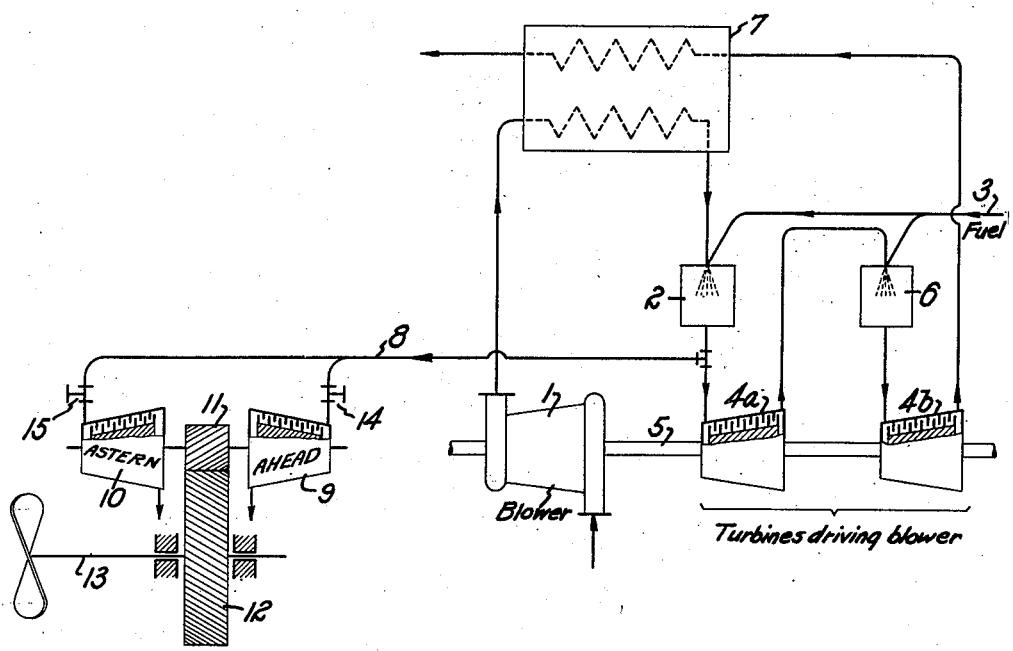
Inventor:
Adolf Meyer,
By Potter, Pierce + Scheffler,
Attorneys.

Patented July 1, 1941

2,247,845

UNITED STATES PATENT OFFICE 2,247,845

COMBUSTION TURBINE PLANT

Adolf Meyer, Kusnacht, near Zurich, Switzerland, assignor to Aktiengesellschaft Brown, Boveri & Cie, Baden, Switzerland, a joint-stock company Application June 6, 1939, Serial No. 277,738
In Germany April 20, 1938

3 Claims. (Cl. 60—41)

This invention relates to combustion turbine plants, and particularly to apparatus for combining high efficiency with small space requirements.

It has been proposed to increase the efficiency of a constant pressure combustion turbine plant by heating the air from the blower by heat abstracted from the gases exhausted from the gas turbine, and by dividing the turbine into a plurality of sections between which the driving gases are subjected to an intermediate heating by burning in auxiliary combustion chambers. The first method is open to the objections that extensive heat exchange surfaces, which result in a considerable loss of pressure, are required to obtain an appreciable increase in efficiency. The second method is open to the objection that the space requirements are materially increased by the inter-stage combustion chambers and by the large diameter pipes or conduits for handling the large quantities of gas in a constant pressure gas turbine system.

An object of this invention is to provide a gas turbine plant of relatively small size and high efficiency in which separate turbines are employed for driving the air blower and for developing useful power, the portion of the plant which operates the blower being designed for higher efficiency than the portion of the plant that develops useful power. An object is to provide a combustion gas turbine plant that is characterized by separate turbines for developing useful power and for driving the blower system, the turbine equipment for operating the blower including a plurality of turbines connected through a recuperator, intermediate heater or other device for increasing the efficiency of that portion of the complete installation.

These and other objects and advantages of the invention will be apparent from the following specification when taken with the accompanying drawing in which the single view is a schematic illustration of a combustion turbine plant embodying the invention.

The particular embodiment of the invention which is illustrated in the drawing is employed for ship propulsion. The reference numeral I identifies the blower for supplying air under pressure to a combustion chamber 2 to which fuel is supplied through a pipe or conduit 3, and burned under constant pressure. The quantity of air is substantially in excess of that required for complete combustion of the fuel, for example about three times the minimum required quantity, to reduce the combustion temperature to an allowable value. A part of the combustion gases passes to the turbine 4a on a shaft 5 that carries the rotor element of the blower I and the rotor of a second turbine 4b. The gases exhausted from the turbine 4a pass to a second combustion chamber 6 where additional fuel from the pipe 3 is burned to increase the pressure of the gases supplied to the turbine 4b. The exhaust from the turbine 4b passes through the heat exchanger 7 to preheat the air from blower I before it arrives at the combustion chamber 2.

The turbines 4a, 4b drive the blower I but do not develop additional power for carrying the load of the combustion turbine plant. A pipe 8 extends from the combustion chamber 2 to the ahead and astern power turbines 9, 10, respectively, that have a common shaft carrying a pinion II that meshes with a gear 12 on the propeller shaft 13. Control valves 14, 15, respectively, are provided in the pipe connections to the power turbines. The power turbines exhaust to atmosphere and therefore are not subject to the back pressure against which turbines 4a, 4b work by exhausting into a heat exchanger.

The power gases, or energy in the power gases, supplied to the power turbines is not employed with the same efficiency as the power gases that drive the turbines 4a, 4b for operating the blower, but certain advantages are obtained by the described construction. The plant assembly is simplified, with a substantial reduction in space requirements, by exhausting the gases from the power turbine or turbines to atmosphere and employing only the exhaust from the blower-driving turbines to preheat the air supply. About three-fourths of the total output is developed by the blower-driving turbines and therefore approximately the maximum efficiency is obtained without abstracting energy from the exhaust from the power turbine.

The turbine or turbines that develop useful power do not operate against the back pressure of a heat exchanger, the size of the additional combustion chamber 6 is reduced and, for the same useful power the weight of the assembly is reduced in comparison with prior systems or, for the same total weight, greater useful power is developed. In the case of ship propulsion, the control and reversing are facilitated and the starting time is reduced when the heat storage masses previously associated with the power turbines are eliminated.

It is to be understood that the invention is not limited to the particular embodiment herein described as similar advantages may be obtained when the load on the turbine plant does not require a reversal of the direction of drive of the power system.

I claim:

1. In a combustion turbine plant, a combustion chamber, blower means for delivering air to said chamber, means for supplying fuel to said chamber, turbine means comprising a pair of turbines for driving said blower means, inlet means connecting the first of said turbines to said chamber for operation of that turbine on pressure gases developed in said chamber, means for heating the exhaust gases from said first turbine and delivering the same to the second turbine for actuating the same, and a power turbine operating in parallel with said turbine means on pressure gases developed in said chamber, said power turbine exhausting against a back pressure substantially lower than that of said turbine means.

2. In a combustion gas turbine plant, a combustion chamber, a blower for delivering air to said chamber, means for supplying fuel to said chamber, a turbine operating on pressure gases developed in said chamber for operating said blower, a power turbine operating in parallel with said first turbine on pressure gases developed in said chamber, said power turbine exhausting against a substantially lower back pressure than that of said blower-driving turbine, and means for recovering energy from the exhaust of said blower-driving turbine; said energy-recovering means comprising a second blower-driving turbine mechanically coupled to the first blower-driving turbine, and means for heating the exhaust gases from the first blower-driving turbine and delivering the heated exhaust gases to the second blower-driving turbine to actuate the same.

3. In a combustion turbine plant, a combustion chamber, a blower for delivering air to said chamber, means for supplying fuel to said chamber, a turbine having a plurality of sections for simultaneously driving said blower, means for passing in succession through said sections of the turbine pressure gases developed in said combustion chamber, means intermediate an adjacent pair of sections of said turbine for heating the pressure gases passing from one turbine section to the other, a single section turbine for developing power, and means for supplying to said power turbine pressure gases from said combustion chamber and at the pressure of the gases supplied to the highest pressure section of said blower-driving turbine, said single section turbine exhausting to atmosphere.

ADOLF MEYER.